United States Patent
Sakamoto

[19]

[11] Patent Number: 5,879,724
[45] Date of Patent: Mar. 9, 1999

[54] MOLDING METHOD AND APPARATUS USING FILM AS MOLDING

[75] Inventor: Yoshio Sakamoto, Hachiouji, Japan

[73] Assignee: Kabushiki Kaisha Kenwood, Japan

[21] Appl. No.: 757,707

[22] Filed: Nov. 27, 1996

Related U.S. Application Data

[63] Continuation of Ser. No. 309,328, Sep. 20, 1994, abandoned.

[30] Foreign Application Priority Data

Sep. 20, 1993 [JP] Japan .................................. 5-255295

[51] Int. Cl.$^6$ ............................ B29C 51/08; B29C 51/38
[52] U.S. Cl. .......................... 425/385; 425/388; 425/395; 425/397; 425/DIG. 48
[58] Field of Search ................................ 425/387.1, 388, 425/395, 397, DIG. 48, 385; 264/292

[56] References Cited

U.S. PATENT DOCUMENTS

| | | | |
|---|---|---|---|
| 1,671,577 | 5/1928 | Gluckin et al. ................. | 425/DIG. 48 |
| 3,142,089 | 7/1964 | Wilkalis et al. ................ | 425/DIG. 48 |
| 3,173,174 | 3/1965 | Edwards ............................... | 425/387.1 |
| 3,193,881 | 7/1965 | Kostur ..................................... | 425/388 |
| 3,205,110 | 9/1965 | Rinderspacher et al. ............... | 264/292 |
| 3,995,763 | 12/1976 | Ayers et al. ............................. | 425/388 |
| 4,419,307 | 12/1983 | Kohara et al. ................... | 425/DIG. 29 |
| 4,462,786 | 7/1984 | Perryman .............................. | 425/388 |
| 4,464,329 | 8/1984 | Whiteside et al. .................... | 425/388 |
| 4,571,320 | 2/1986 | Walker .................................. | 425/397 |
| 4,695,243 | 9/1987 | Watanabe .............................. | 425/388 |
| 4,839,117 | 6/1989 | Swenson et al. .................. | 425/817 R |
| 4,878,823 | 11/1989 | Blomquist ............................. | 425/116 |
| 4,973,241 | 11/1990 | Keyser .................................. | 425/503 |
| 5,108,529 | 4/1992 | Shuert ................................... | 425/388 |
| 5,273,705 | 12/1993 | Sakamoto ............................. | 264/343 |
| 5,399,081 | 3/1995 | Sakamoto ............................. | 425/812 |
| 5,409,767 | 4/1995 | Tradeau et al. ....................... | 425/388 |
| 5,460,497 | 10/1995 | Vismara ................................ | 425/388 |

FOREIGN PATENT DOCUMENTS

| | | | |
|---|---|---|---|
| 238442 | 2/1965 | Germany ...................... | 425/DIG. 24 |
| 378035 | 7/1965 | Switzerland .......................... | 264/292 |

*Primary Examiner*—Catherine Timm
*Attorney, Agent, or Firm*—Sixeby, Friedman, Leedom & Ferguson, P.C.; Gerald J. Ferguson, Jr.; Tim L. Brackett, Jr.

[57] ABSTRACT

A molding method and apparatus capable of reliably removing a molded product without deformation even if the product has a shape difficult to be removed, such as a shape having a plurality of vertical portions. The method of molding a product by using a film sheet, includes the steps of: adapting to operate a pair of film pushing rings disposed facing upper and lower metal molds of a molding apparatus for thermally molding a product by using a film sheet, independently from the upper and lower metal molds; attracting and attaching a molded product to one of the upper and lower metal molds; fixing the ring on the side of the one metal mold; attracting and attaching a pickup jig to the molded product in tight contact therewith, the pickup jig having a surface shape matching the surface shape of the molded product; releasing the attraction and attachment by the one metal mold and moving the pickup jig to displace the molded product from the one metal mold; and moving the fixed ring to an original position.

11 Claims, 12 Drawing Sheets

MOLDING METHOD AND APPARATUS USING FILM AS MOLDING

This application is a Continuation of Ser. No. 08/309,328, filed Sep. 20, 1994, now abandoned.

BACKGROUND OF THE INVENTION

1. Field of the Invention

The present invention relates to a molding method and apparatus using a film sheet as a molding material, and more particularly to a molding method and apparatus for molding a deep drawing product with two walls spaced by a small gap.

2. Related Background Art

The present applicant has proposed a molding method and apparatus for molding an acoustic diaphragm by using a poly-para-phenyleneterephthalamide (hereinafter called PPTA) film suitable for deep drawing and excellent in acoustic physical properties (Japanese Patent Application No.5-107368).

Figure 9:
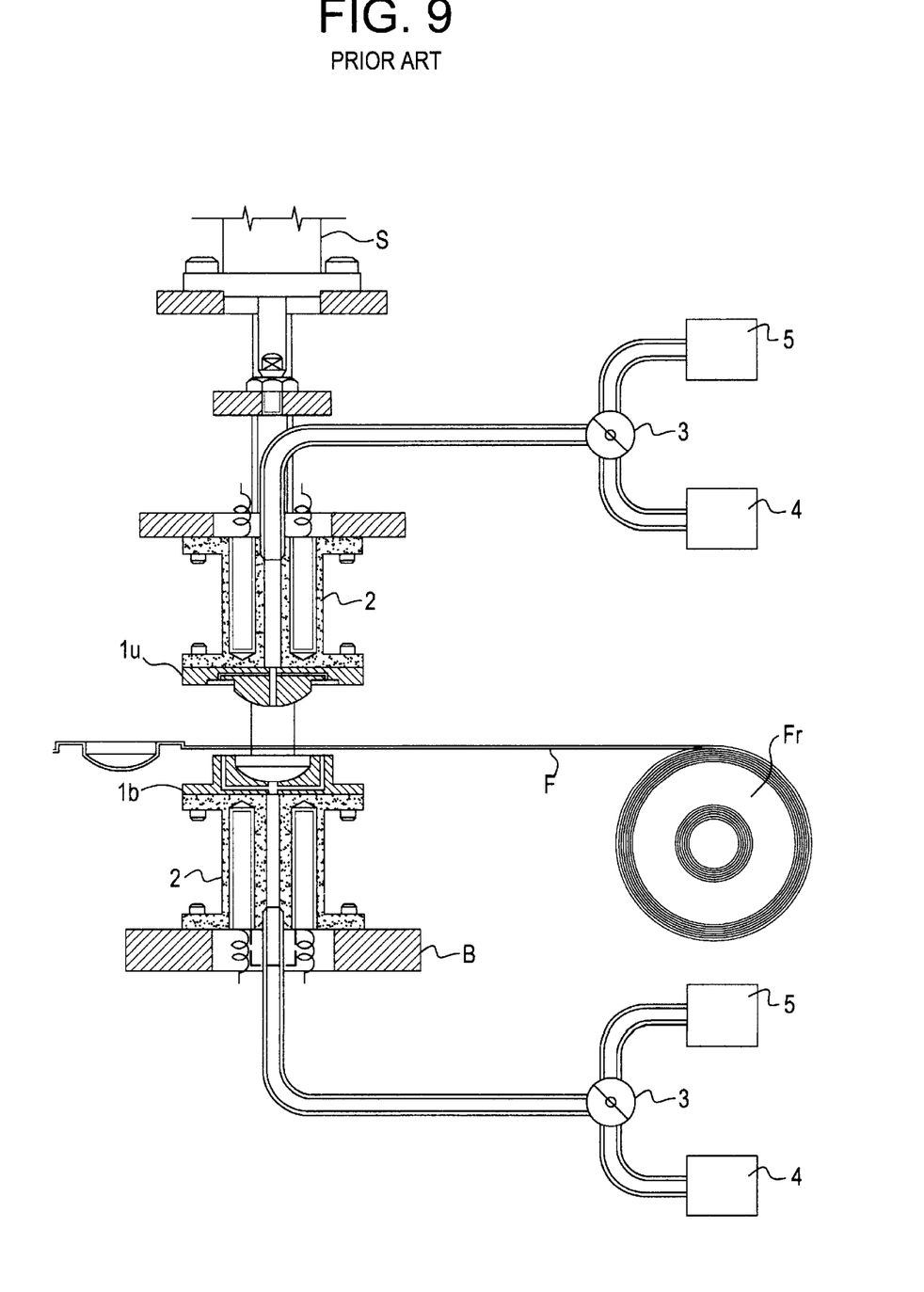
FIG.9 is a side cross sectional view of a diaphragm molding apparatus proposed by the present applicant.

This method and apparatus will be explained with reference to FIGS.9 to 12. A PPTA gel film is prepared which contains water at least 50% or more, or preferably 80% or more, as a swelling substance and has a thickness of about 140 μm. The swelling water is evaporated in an oven at about 180° C. to obtain an amorphous hard film F which is not drawn and has a density lower than a predetermined value. This film is pulled and placed between upper and lower metal molds as shown in FIG.9. The upper metal mold 1u is heated to 380° C. and the lower metal mold 1b is heated to 250° C. Under this condition, the film is pressed for about 30 seconds and thermally fixed. Thereafter, a changeover valve 3 of the upper metal mold 1u is switched to the side of an exhauster 5. While the exhauster 5 is operated, a cylinder S is raised and the metal molds are released. Thereafter, an exhauster 5 of the lower metal mold 1b is stopped and a valve 3 is switched to the exhauster 5 to operate it, and the thermally molded product is removed from the metal molds.

Figure 10:
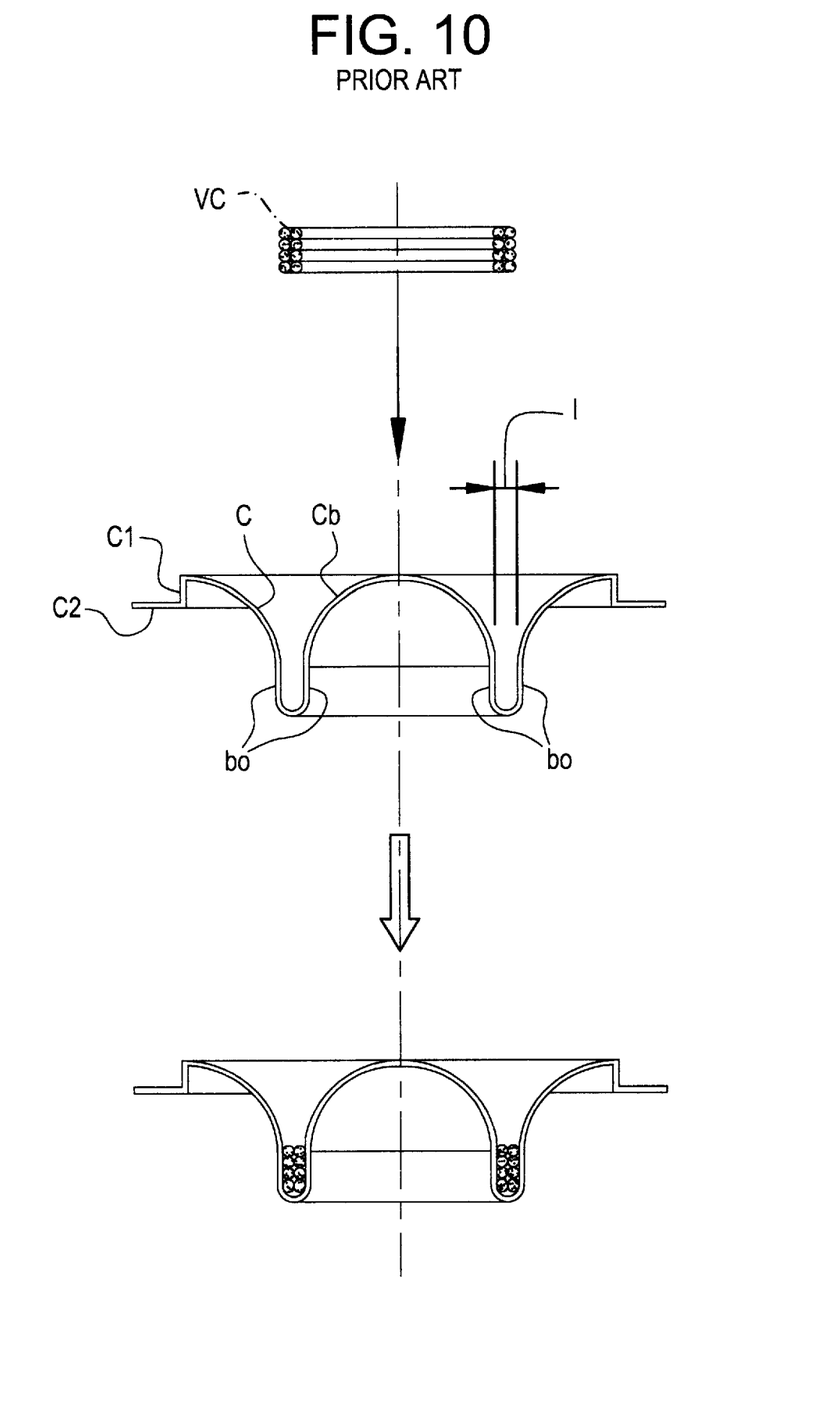
FIG.10 is a cross sectional view of a diaphragm having a cone, a chamber, a voice coil, and the like integrally formed.

This molding method and apparatus are suitable for molding a product having a relatively simple shape, for example, an ordinary dome-shaped of cone-shaped loudspeaker diaphragm, as shown in FIG. 9. However, with this molding method, it is difficult to remove a molded product smoothly from the metal molds, if the product has a complicated shape such as shown in FIG.10. This diaphragm has a cone C, a voice coil bobbin bo, and a chamber Cb integrally molded. A voice coil VC is inserted into the bobbin bo having a slit with a gap I of about 0.3 to 0.2 mm. This product is a deep drawing product having a plurality of vertical portions (bobbin bo) spaced by a very small gap.

A film molding apparatus generally uses film pushing rings 6u and 6b depending on the position relationship between a film and metal molds and the shape, material, and the like of a product to be molded. In the conventional apparatus shown in FIG.11, the rings 6u and 6b are mounted on the upper and lower metal molds 1u and 1b by springs Sp, and they move as the metal molds are moved up and down.

Figure 11:
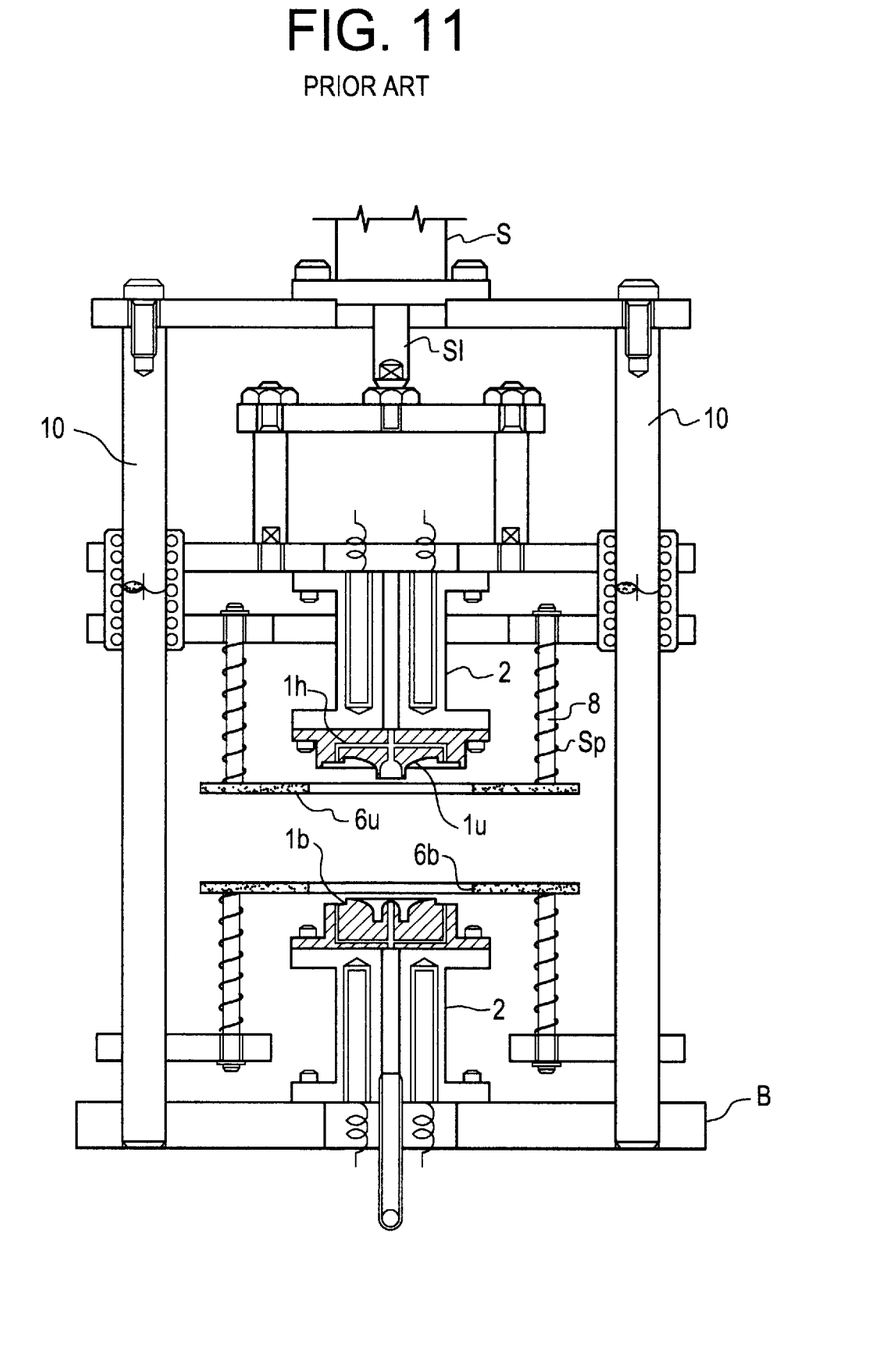
FIG.11 is a front cross sectional view of a conventional film molding apparatus to which the diaphragm molding apparatus proposed by the present applicant is applied.
Figure 12:
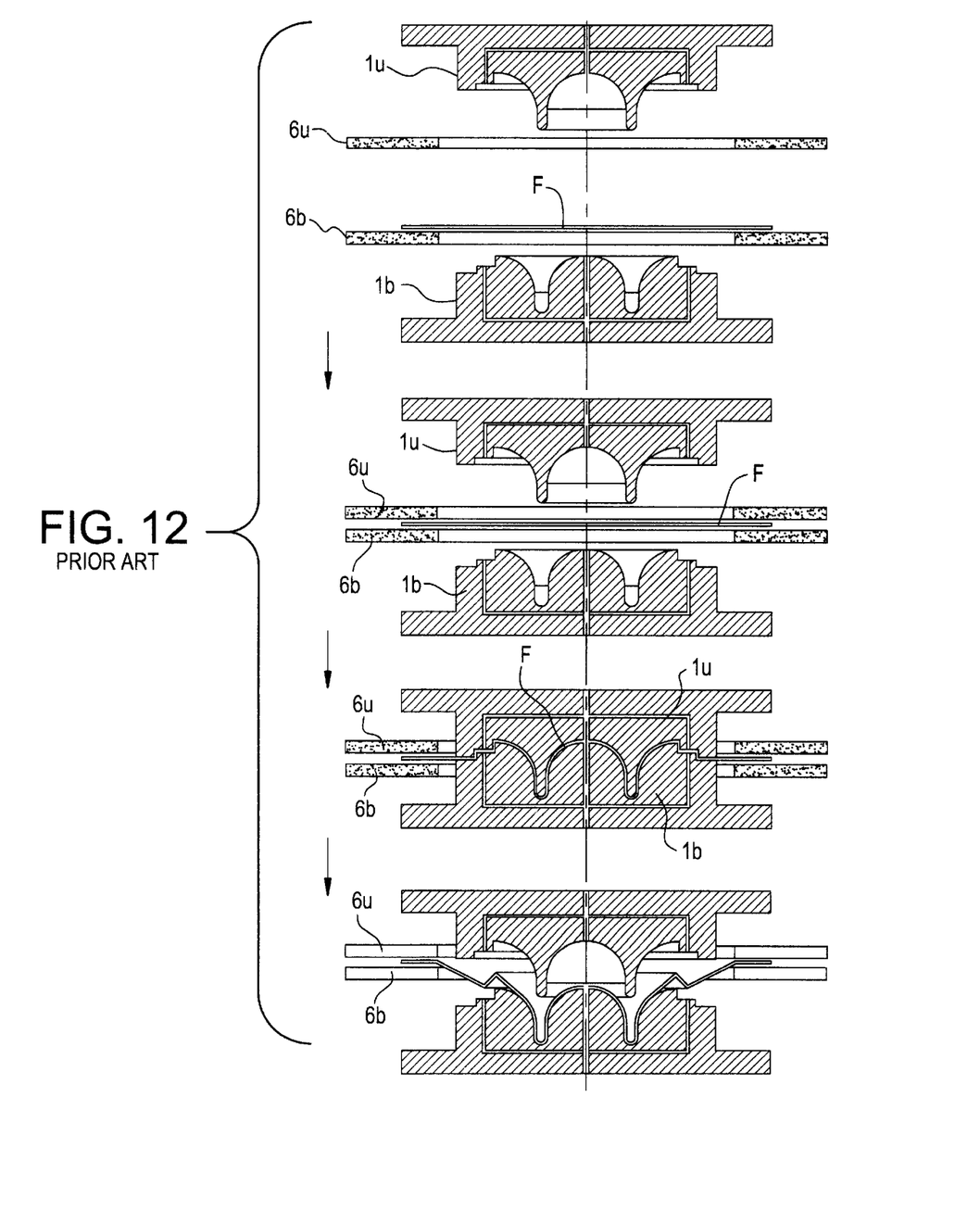
FIG.12 is a cross sectional view showing the main part of a conventional film molding apparatus and explaining disadvantages associated with a diaphragm having a cone, a chamber, and a bobbin integrally formed.

This motion will be detailed with reference to FIGS.11 and 12. While the metal molds 1u and 1b are being released, the lower ring 6b supports the film F pulled to an intermediate position between the upper and lower molds 1u and 1b which is a predetermined position not allowing the film F to contact the lower metal mold 1b. As the upper metal mold 1u lowers, the upper ring 6u lowers. As shown, the upper and lower rings 6u and 6b are disposed projecting from the upper and lower metal molds 1u and 1b. Therefore, as the upper metal mold 1u lowers, the upper ring 6u and lower ring 6b abut together to clamp the film F before the upper metal mold 1u abuts the lower metal mold 1b.

As the upper metal mold 1u further lowers, the springs Sp mounted on the rings 6u and 6b are compressed and the rings 6u and 6b clamping the film F lower. Thereafter, the clamped film F is pressed by the upper and lower metal molds 1u and 1b. As shown in FIG.11, during this pressing, the rings 6u and 6b are near at the intermediate position of the outer walls of the metal molds 1u and 1b pressing the film F. Since the metal molds 1u and 1b are being heated to predetermined temperatures by heater blocks 2, the film F is thermally molded. After the film F is pressed for a predetermined time, the upper mold rises and released from the lower mold. As the compression forces of the springs Sp become weak, the rings 6u and 6b start rising to retain the initial position. As the upper ring 6u further rises toward the upper metal mold 1u, the upper metal mold 1u detaches from the unmolded outer circumference of the molded product, i.e., the film F.

The motion of the rings 6u and 6b described above poses no practical problem so long as the shape of a product is simple. However, in the case of a product having a complicated shape such as a plurality of vertical portions described above, the vertical portions, particularly those of the bobbin bo, rise in tight contact with the upper metal mold 1u, resulting in a defective product.

In order to deal with the above disadvantages, the present applicant has proposed a molding method whereby a product is attracted and attached to the upper metal mold 1u or lower metal mold 1b to remove it from the metal molds. If a product is attracted and attached to the lower metal mold 1b, it can be removed smoothly without a tight contact of the upper metal mold 1u with the vertical portions, when the metal molds 1u and 1b are released (when the upper metal mold 1u rises).

However, if this approach is used with the conventional apparatus in which the motion of the rings 6u and 6b follows the motion of the metal molds 1u and 1b, the rings 6u and 6b start moving when the upper metal mold 1u is completely removed from the lower metal mold 1b. In this state, the rings 6u and 6b move while clamping the film F. Therefore, as shown in FIG.12, the outer circumference of the product is raised by the rings 6u and 6b, resulting in a defective product.

On the other hand, if a product is attracted and attached to the upper metal mold 1u, a defective product is formed which is similar to a product formed by using an approach of not attracting and attaching the product to the metal molds 1u and 1b. In order to deal with this phenomenon, we have tried to remove a produce by blowing air from suction holes formed in the metal molds 1u and 1b immediately before the rings 6u and 6b are moved. This approach is very effective for a product having a simple shape. However, in the case of a product having a plurality of vertical portions described above, a defective product is formed by a local deformation, for example, a deformation of the cone C although the chamber Cb is normal.

Specifically, a product with a plurality of vertical portions has a plurality of partial products partitioned by the vertical portions. A local deformation is inevitable unless a uniform pressure is applied at the same time to each partial product constituting the chamber Cb and cone C. Although this phenomenon can be settled to some degree if the position, number, diameter, and the like of air blowing holes are devised, a defective occurrence factor becomes large in the case of mass production of molded products.

The reason for this is as follows. A tight contact state of a product to the metal molds 1u and 1b changes with time if there is a fine variation of thicknesses, materials, and the like of the film F. Therefore, air blow matching each tight contact state is required. However, it is difficult to detect a tight contact state and adjust an air pressure so as to follow a change in the tight contact state. This approach is therefore unable to be realized in practice. Furthermore, a constant air blow results in a defective product with a local deformation.

The rings 6u and 6b are very effective for pressing shrinks of the film F formed during the molding. It is necessary, however, to optimize the inner diameter shapes of the rings 6u and 6b, the clamping positions, and the like, depending on the shape of a product to be molded. However, the conventional apparatus has the rings 6u and 6b directly mounted on ring supports 8, and there is a small space near at the metal molds 1u and 1b being unable to use jigs. As a result, in replacing the rings 6u and 6b, the ring supports 8 are dismounted from the base side and the springs 6u and 6b are dismounted, complicating the replacement work. Mounting and dismounting the metal molds 1u and 1b and other works are possible only after the rings 6u and 6b are dismounted, complicating the maintenance work.

SUMMARY OF THE INVENTION

It is an object of the present invention to solve the above-described disadvantages of the conventional molding method and apparatus and provide a molding method and apparatus capable of reliably removing a molded product without deformation even if the product has a shape difficult to be removed, such as a shape having a plurality of vertical portions.

In order to achieve the above object of the invention, there is provided a method of molding a product using a film sheet including the steps of: adapting to operate a pair of film pushing rings disposed facing upper and lower metal molds of a molding apparatus for thermally molding a product by using a film sheet, independently from the upper and lower metal molds; attracting and attaching a molded product to one of the upper and lower metal molds; fixing said ring on the side of the one metal mold; attracting and attaching a pickup jig to the molded product in tight contact therewith, the pickup jig having a surface shape matching the surface shape of the molded product; releasing the attraction and attachment by the one metal mold and moving the pickup jig to displace the molded product from the one metal mold; and moving the fixed ring to an original position. The pickup jig may be cooled while picking up the molded product by the pickup jig, thereby increasing the strength of the molded product to be removed and providing a more reliable shape of a molded product of a general thermoplastic film sheet. A frame of the film sheet to be next molded can be pulled between the upper and lower metal molds by moving the pickup jig attracting and attaching the molded product. The film sheet for molding an acoustic diaphragm may be a poly-para-phenyleneterephthalamide film sheet formed from a gel film containing water at least 50% or more, or preferably 80% or more, as a swelling substance by evaporating the water to obtain an amorphous hard film sheet which is not drawn and has a density lower than a predetermined value. A product to be molded may be a deep drawing product having walls facing each other by a small gap therebetween, such as an acoustic diaphragm.

If the film sheet is a thermoplastic film sheet, the molded product can be removed from the one metal mold without cooling the one metal mold and maintaining the molding temperature.

In addition to the PPTA film, other films such as a thermoplastic resin film sheet, a thermosetting resin film, a woven cloth sheet, and an unwoven cloth sheet may also be used.

A product to be molded may be a deep drawing product having walls facing each other by a small gap therebetween, such as an acoustic diaphragm.

The molding apparatus for molding a product by using a film sheet includes: a suction/exhaustion mechanism for sucking and exhausting air from a hole or slit opening in a molding surface of one of upper and lower metal molds; a pair of film pushing rings disposed facing the upper and lower metal molds and adapted to operate independently from the upper and lower metal molds; and a pickup jig movably disposed and having a surface shape matching the surface shape of the molded product.

The film pushing rings are adapted to be removable in the direction other than the direction of clamping the film pushing rings.

In releasing the metal molds after the molding, the molded product is attracted and attached to one of the upper and lower metal molds, and the ring on the side of the one metal mold is fixed and is unable to move. With this arrangement, a deformation to be caused by a motion of the ring can be avoided. After the complete release of the metal molds, the pickup jig attracts and attaches the finished molded product, moves to the outside of the press machine, and removes it from the metal mold. At this time, the ring moves to the initial position and enters a standby state.

For the maintenance, the film pushing rings are adapted to be removable in the direction other than the direction of clamping the film pushing rings.

DETAILED DESCRIPTION OF THE PREFERRED EMBODIMENTS

An embodiment of a method of molding a product by using a film sheet according to the present invention will be described in connection with a molding apparatus shown in FIGS.1 to 8. Like elements to those of the conventional elements described with FIGS.9 to 12 are represented by using identical reference numerals, and the description thereof is omitted.

Figure 1:
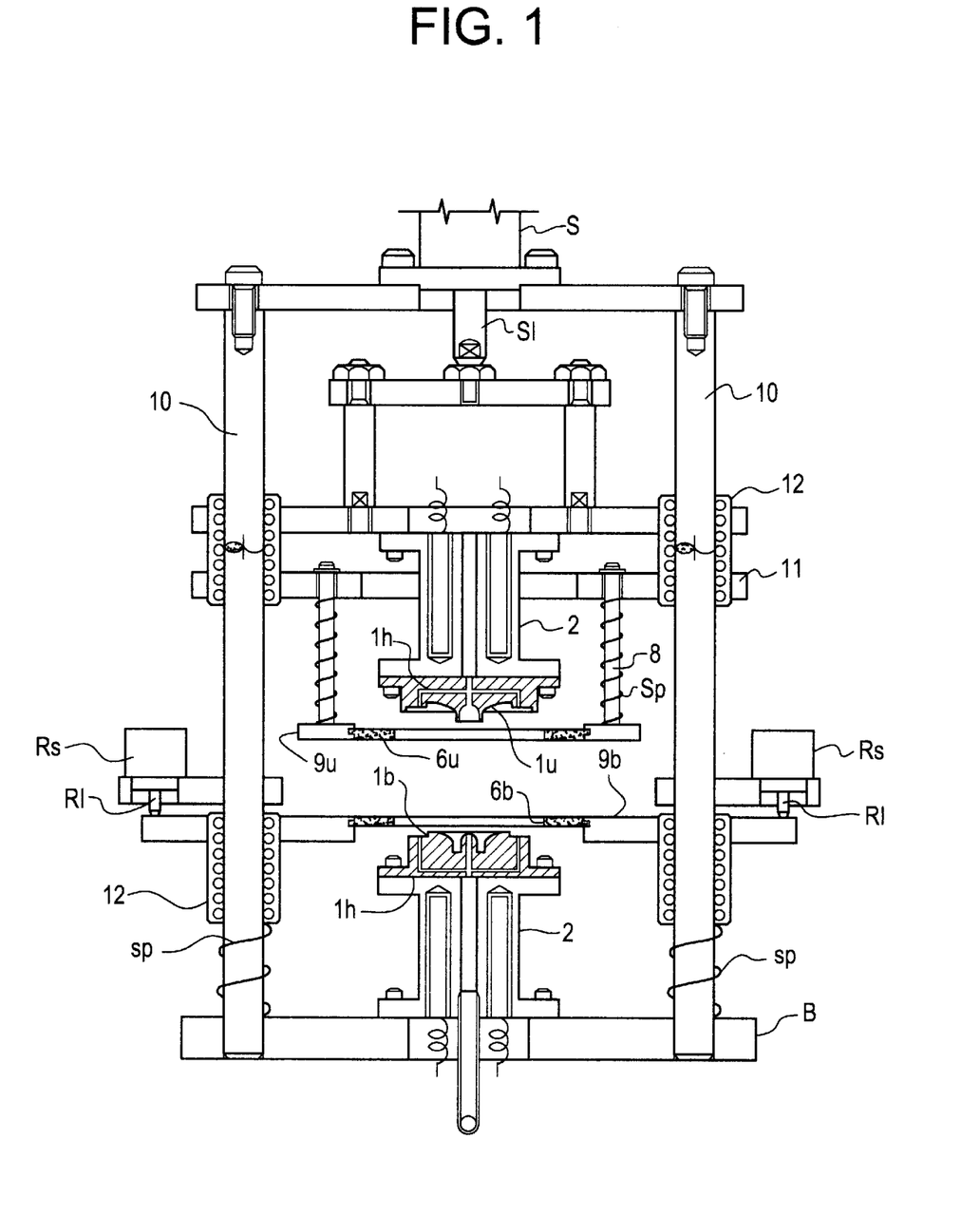
FIG.1 is a front elevational cross sectional view of a molding apparatus for molding a product by using a film sheet according to the present invention.
Figure 2:
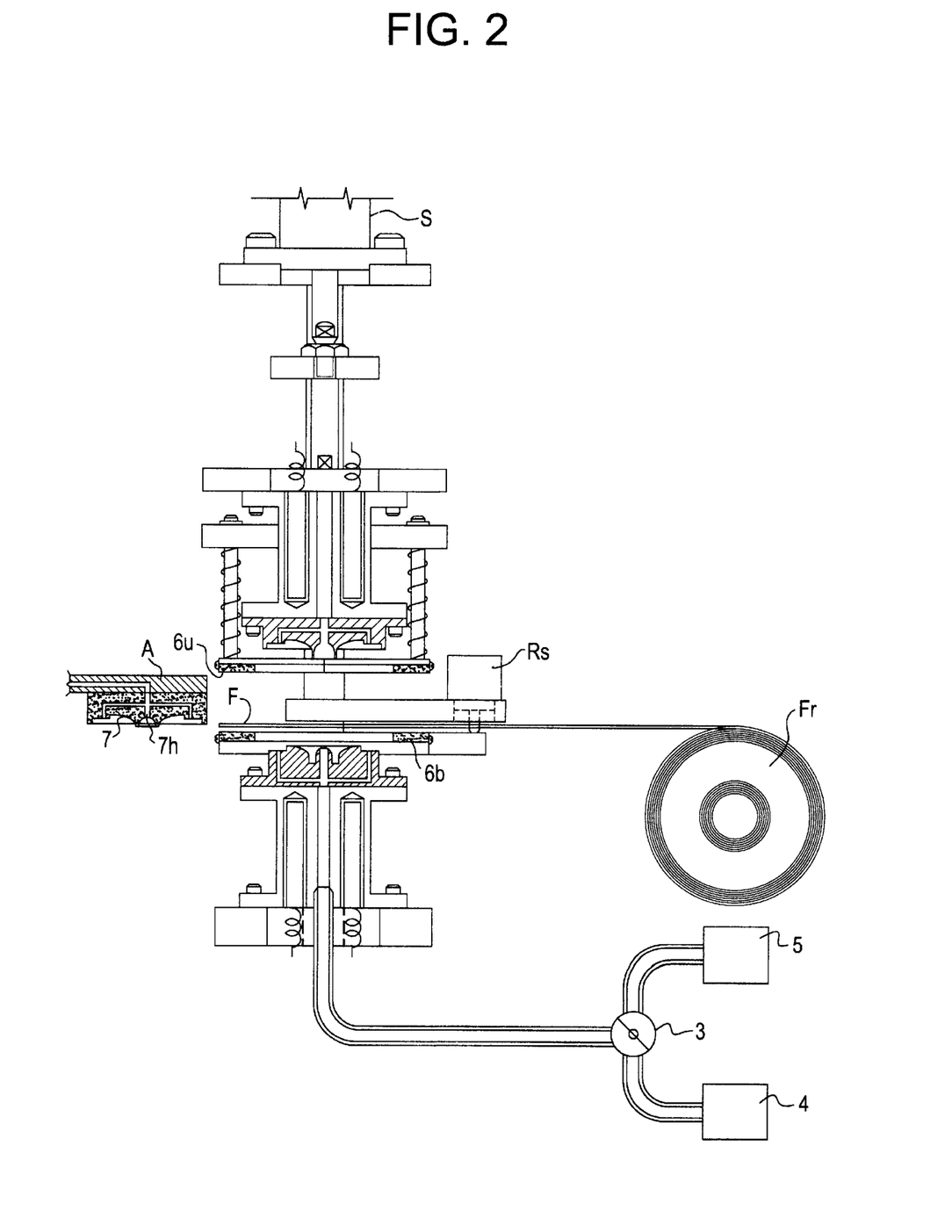
FIG.2 is a side cross sectional view of the molding apparatus in which a film sheet is pulled and placed on a metal mold.

As shown in the front elevational cross sectional view of FIG.1 and the side cross sectional view of FIG.2, a molding machine has an upper metal mold 1u and a lower metal mold 1b mounted on heater blocks 2 which heat the upper and lower metal molds 1u and 1b. In this embodiment, the upper metal mold 1u is mounted on the front end side of a rod S1 of a press cylinder S, and the lower metal mold 1b is mounted on the base B side of the press machine.

The upper and lower metal molds 1u and 1b are formed with fine holes or slits 1h as shown in FIG.1. In this embodiment, holes 1h in the lower metal mold 1b are communicating with the outside of the lower metal mold 1b as shown in FIG.2, and are coupled via a changeover valve 3 to a suction device 4 and an exhauster 5. Holes 1h and the like of the upper metal mold 1u are used for exhausting air between a film F and the upper metal mold 1u during the molding, so as not to form a defective product.

The shape of a product to be molded is similar to that shown in FIG.10. A diaphragm has a cone shape whose diameter is 25.4 mm. A dome-shaped chamber Cb has a diameter of 11.65 mm is formed at the center of the diaphragm. A falling portion, i.e., a diaphragm guide portion C1 having a depth of 2 mm, is formed at the cone outer circumference. An overlap portion C2 having a width of 2 mm is formed extending horizontally from the lower end of the guide portion C1 to the outer circumference of the diaphragm. A voice coil portion bo is formed which is defined by a gap I having a width of 0.22 mm between the inner circumference of the cone C and the outer circumference (generally called a neck) of the chamber Cb, by a falling portion having a depth of 2 mm and formed at the gap I, and by the bottom portion having a radius of 0.11 mm. The above elements form an integral diaphragm. The falling portion of the voice coil is similar to the vertical portion described with the conventional apparatus.

Figures 3A, 3B:
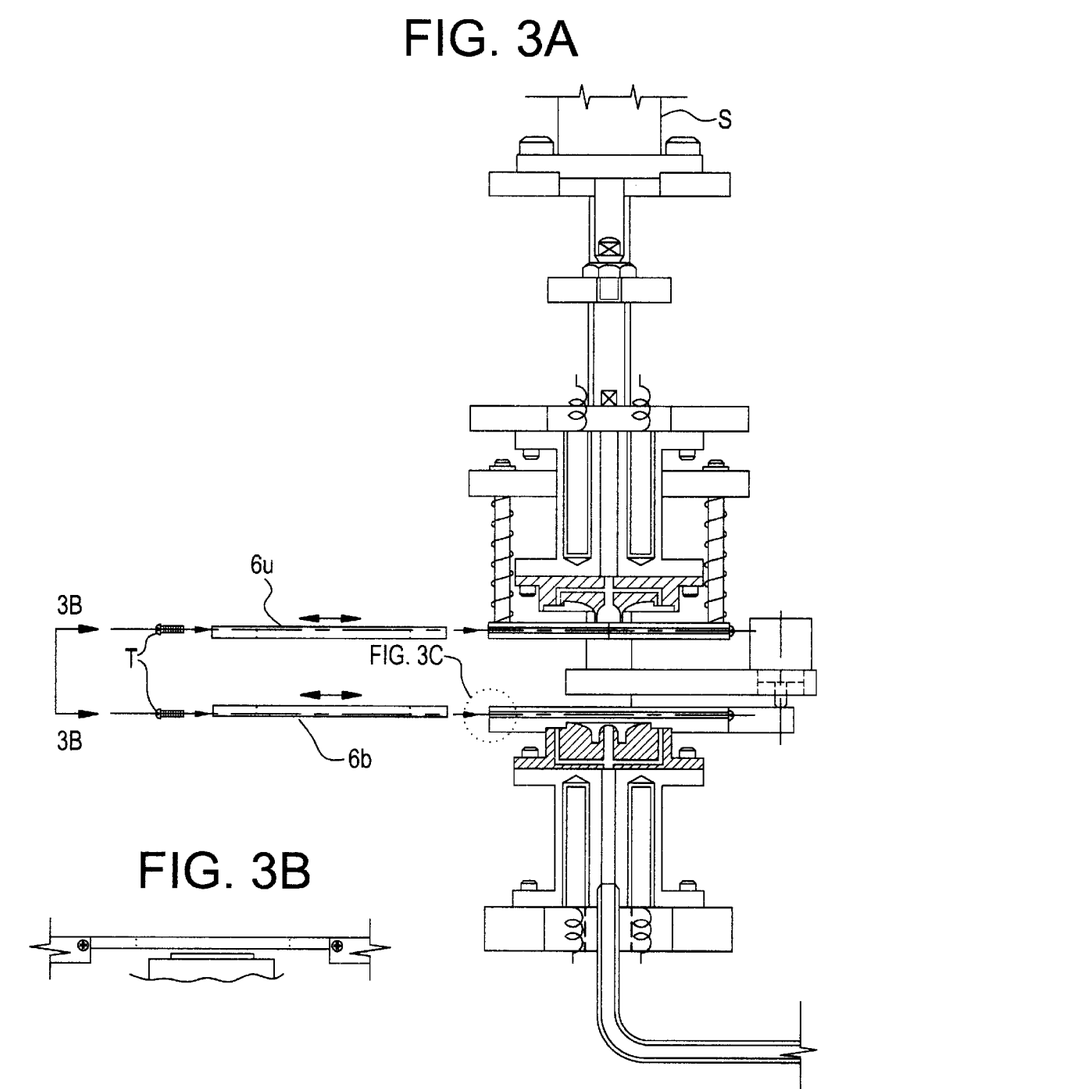
FIG.3A is a side view showing the mounting of the upper and lower rings.
FIG. 3B is a partial front view of the lower ring and mount bases of FIG. 3A.
Figure 3C:
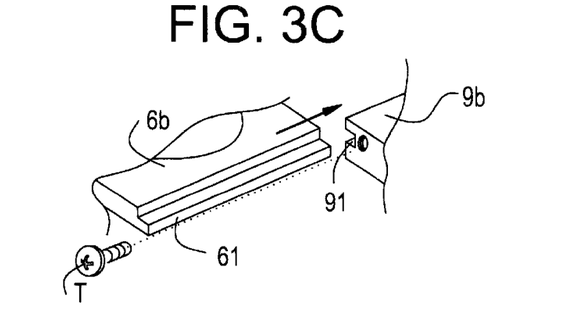
FIG. 3C is a partial perspective view showing the mount structure of a material pressing ring.

A film pushing ring of this embodiment includes an upper ring 6u and a lower ring 6b mounted on a pair of ring mount bases 9u and 9b as shown in FIG.1. As shown in FIG.3C, for the maintenance, grooves 91 are formed in the mount bases 9u and 9b at the inner edges thereof, and the rings 6u and 6b are formed with projections 61 at the edges thereof corresponding to the grooves 91. The rings 6u and 6b are mounted on the mount bases 9u and 9b by sliding them in the arrow direction shown in FIG.3, and fixed thereto by screws T. In this embodiment, four support rods 8 are mounted on the mount base 9u of the upper ring 6u at one ends thereof, and mounted on a support rod mount plate 11 mounted via ball bushes 12 on guide posts 10. Coil springs Sp are fitted on the support rods 8. The mount bases 9b mounting the lower ring 6b are extended outwardly as shown in FIG.1 to mount them on the guide posts 10 by using ball bushes 12. Springs are fitted on the guide posts 10 under the ball bushes. Air cylinders (hereinafter called lock cylinders Rs) are disposed above the lower ring mount bases 9b at opposite ends thereof.

Referring to FIG.2, reference numeral 7 represents a pickup jig. As shown in FIG.2, it has a surface shape matching a product to be molded. In this embodiment, the pickup jig has an attraction/attachment surface matching the cone C and chamber Cb at the bottom thereof. Holes 7h (having a diameter of 1 mm in this embodiment) are formed in the pickup jig as shown in FIG.2. The holes 7h include eight holes formed in the overlap portion near at its central area at an angular interval of 45 degrees, and one hole formed at the apex of the chamber Cb. The holes 7h communicate with a suction device (not shown) mounted at the outside of the jig 7. An available film transport device is worked to mount an arm A shown in FIG.2, and the pickup jig 7 is mounted at the bottom of the arm A. Cooled air or fluid may be circulated in the pickup jig 7 or air may be blown to the surface of the pickup jig 7, to thereby cool the pickup jig 7. By cooling the pickup jig 7, it becomes possible to cool a molded product attracted and attached to the jig and improve the strength of the molded product to be removed. This cooling effect is great particularly for a general thermoplastic film sheet, providing more stable molded products. The press machine and the above-described various devices are sequentially controlled by programs.

The film F used by this embodiment is a PPTA film having a merchandise name "ARAMICA #1000". This film is similar to the above-described conventional film. The film F is formed by the following manner. First a PPTA gel film is formed which contains water at least 50% or more, or preferably 80% or more, as a swelling substance and has a thickness of about 140 μm. The swelling water is evaporated in an oven at about 180° C. to obtain an amorphous hard film F which is not drawn and has a density lower than a predetermined value, to obtain a hard film having a ductility of about 70% and a finished thickness of about 25 μm.

Figure 4:
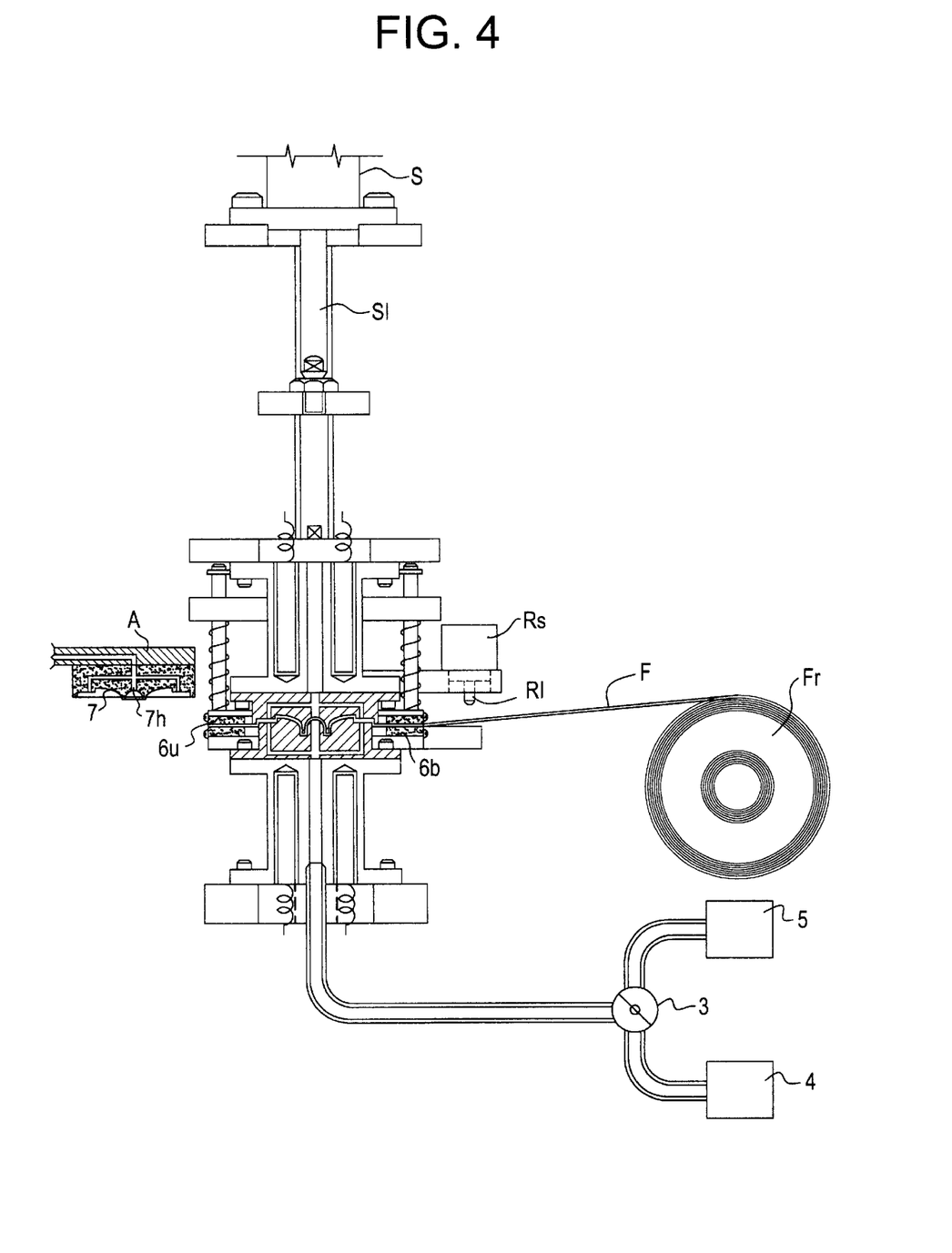
FIG.4 is a side cross sectional view showing a film thermal press and mold state.

This film F is cut to obtain a film roll Fr having a width of 60 mm which is pulled and placed between the metal molds 1u and 1b as shown in FIG.2 and pressed as shown in FIG.4. A press time is about 15 seconds, and the upper and lower metal molds are heated in advance to 380° C. After the molding, the film is thermally fixed and crystallized to obtain predetermined properties of the film F. It is obvious that the rings 6u and 6b operate in the manner similar to the conventional molding apparatus.

Figure 5:
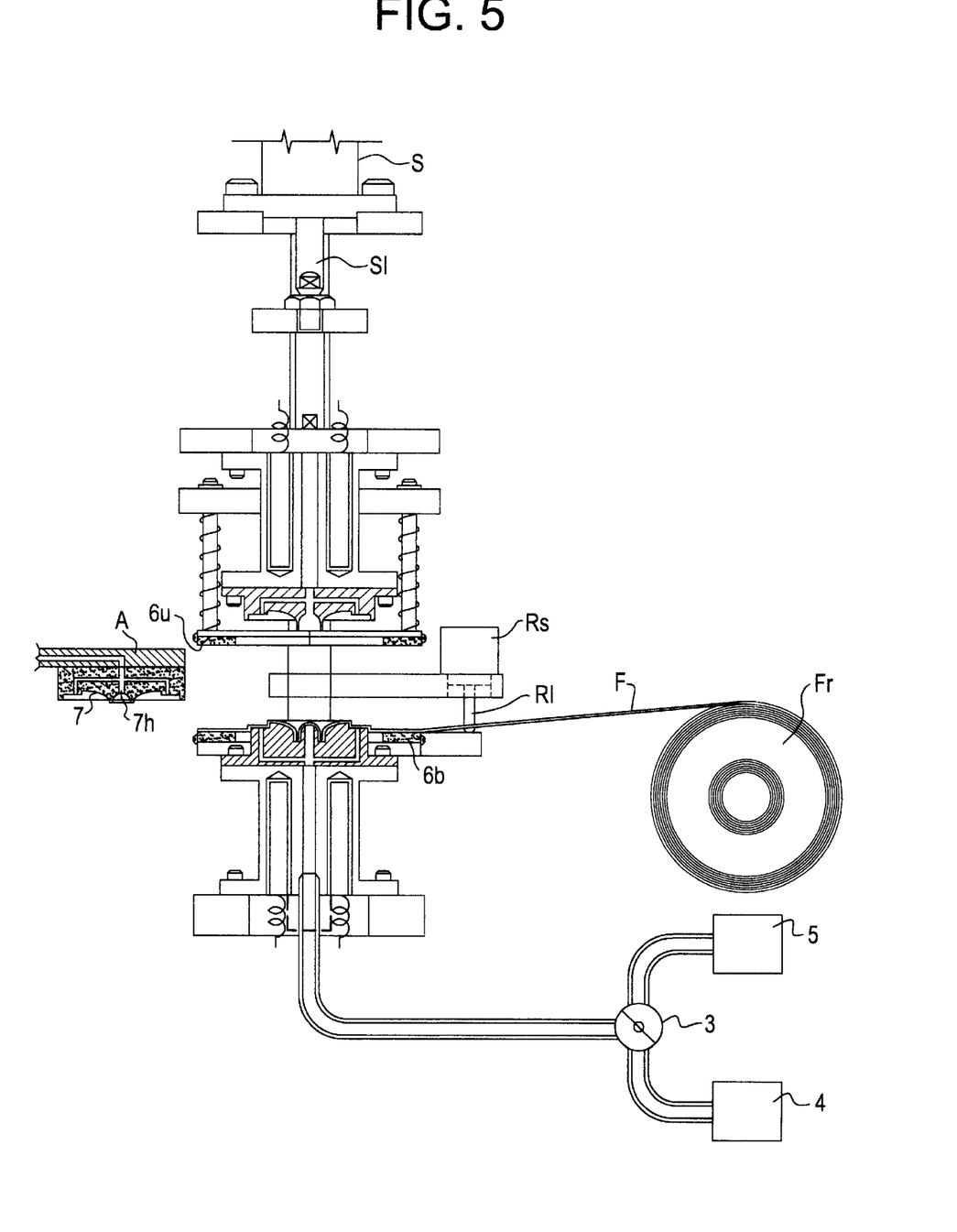
FIG.5 is a diagram showing a release state of the upper metal mold wherein the lower ring is fixed by a lock cylinder and the product is attracted and attached to the lower metal mold.
Figure 6:
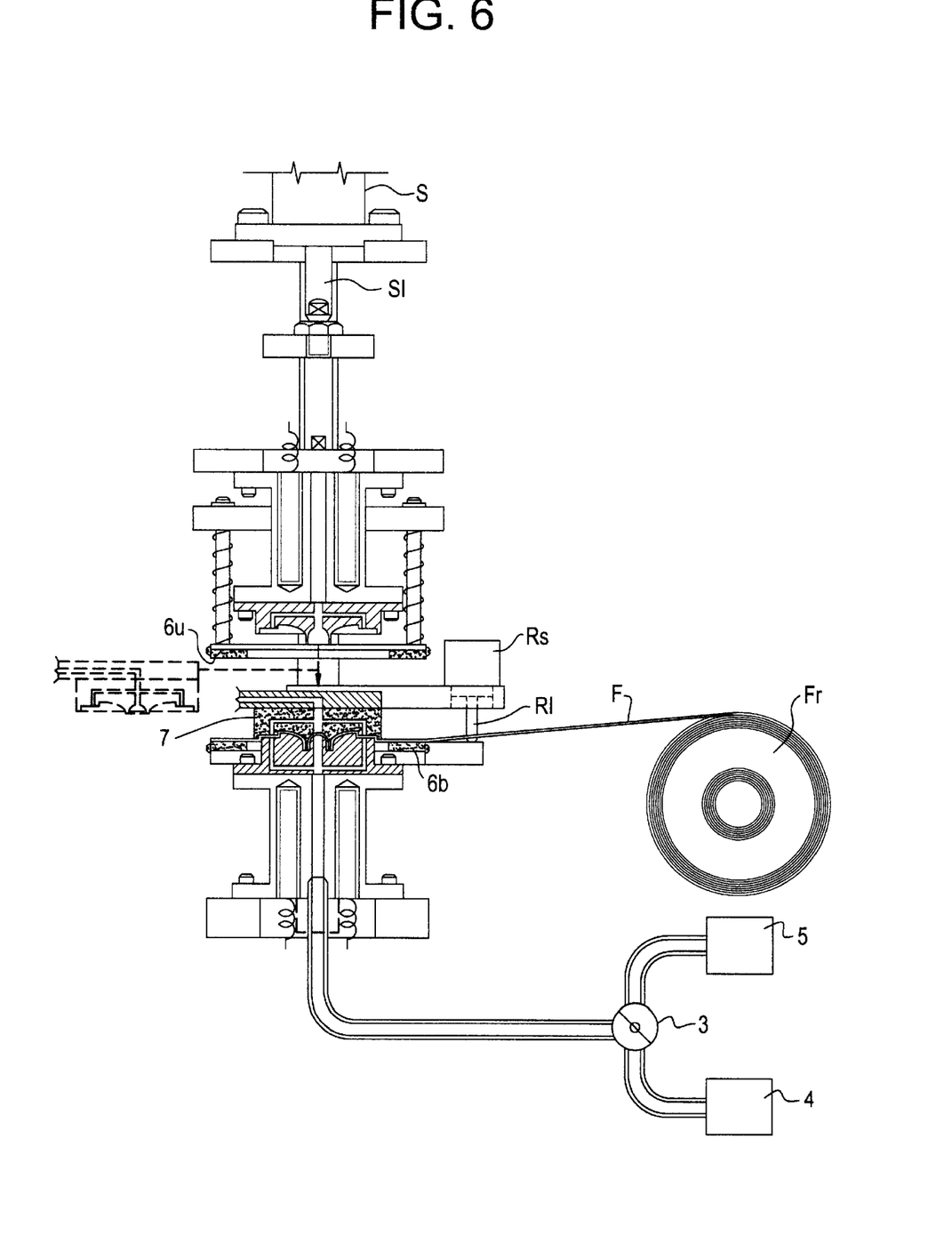
FIG.6 is a diagram showing a tight contact state of a pickup jig to a product while the product is attracted and attached to the lower metal mold.

As shown in FIG.5, in releasing the metal molds 1u and 1b after the molding, the lock cylinders Rs are first operated to project the rods R1 of the cylinders Rs to push the opposite ends of the lower ring mount bases 9b. The lock cylinders Rs are therefore fixed at this position, i.e., at the lowest position of the lower ring 6b. Thereafter, the changeover valve 3 of the lower metal mold 1b is switched to the suction device 4 side. While the suction device 4 is operated, the rod S1 of the cylinder S is raised to raise the upper metal mold 1u. Since the suction device 4 is operating, as the upper metal mold 1u is raised, it is released while the molded product is attracted and attached to the lower metal mold 1b and the lower ring 6b is fixed.

Figure 7:
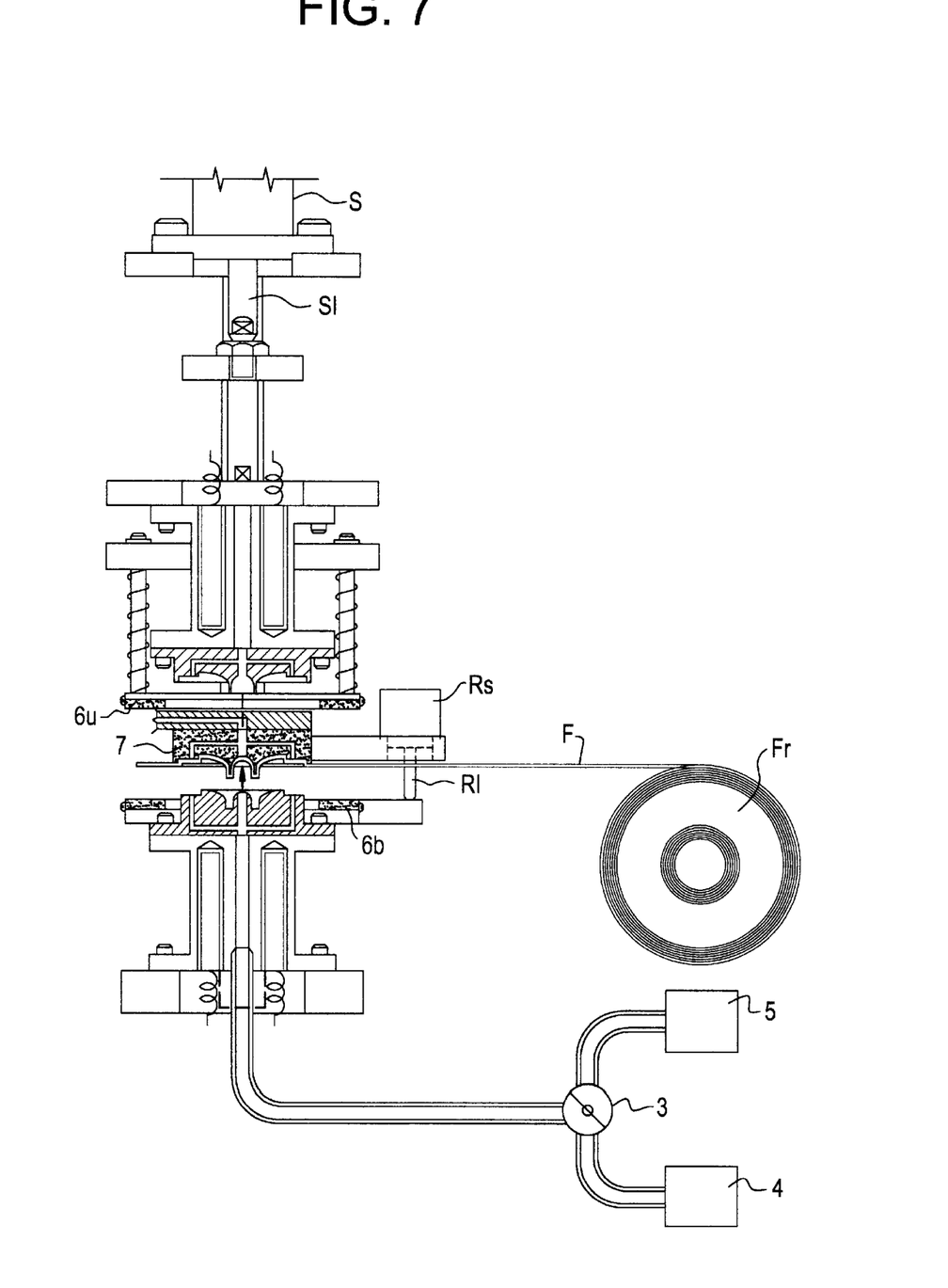
FIG.7 is a diagram showing an upward removal of the product attracted and attached to the lower metal mold.

Under this condition, the film transport device is operated to move the pickup jig 7 mounted on the bottom of the arm A to the position just above the molded product. Then the pickup jig 7 is lowered. Since the pickup jig 7 and the lower metal mold 1b are positioned concentrically, as the pickup jig 7 is lowered, the surface thereof is attracted and attached to the molded product which is sandwiched between the lower metal mold 1b and pickup jig 7. At this stage, the changeover valve 3 of the lower metal mold 1b is switched to the exhauster 5 side. Next, the suction device coupled to the pickup jig 7 is operated to raise the pickup jig 7 as shown in FIG.7. In this case, the exhauster 5 of the lower metal mold 1b is operated instantaneously when the pickup jig 7 starts rising so that the molded product can be reliably attracted and attached to the pickup jig 7 and can be removed from the lower metal mold 1b without any deformation of the molded product during the rise of the jig.

Figure 8:
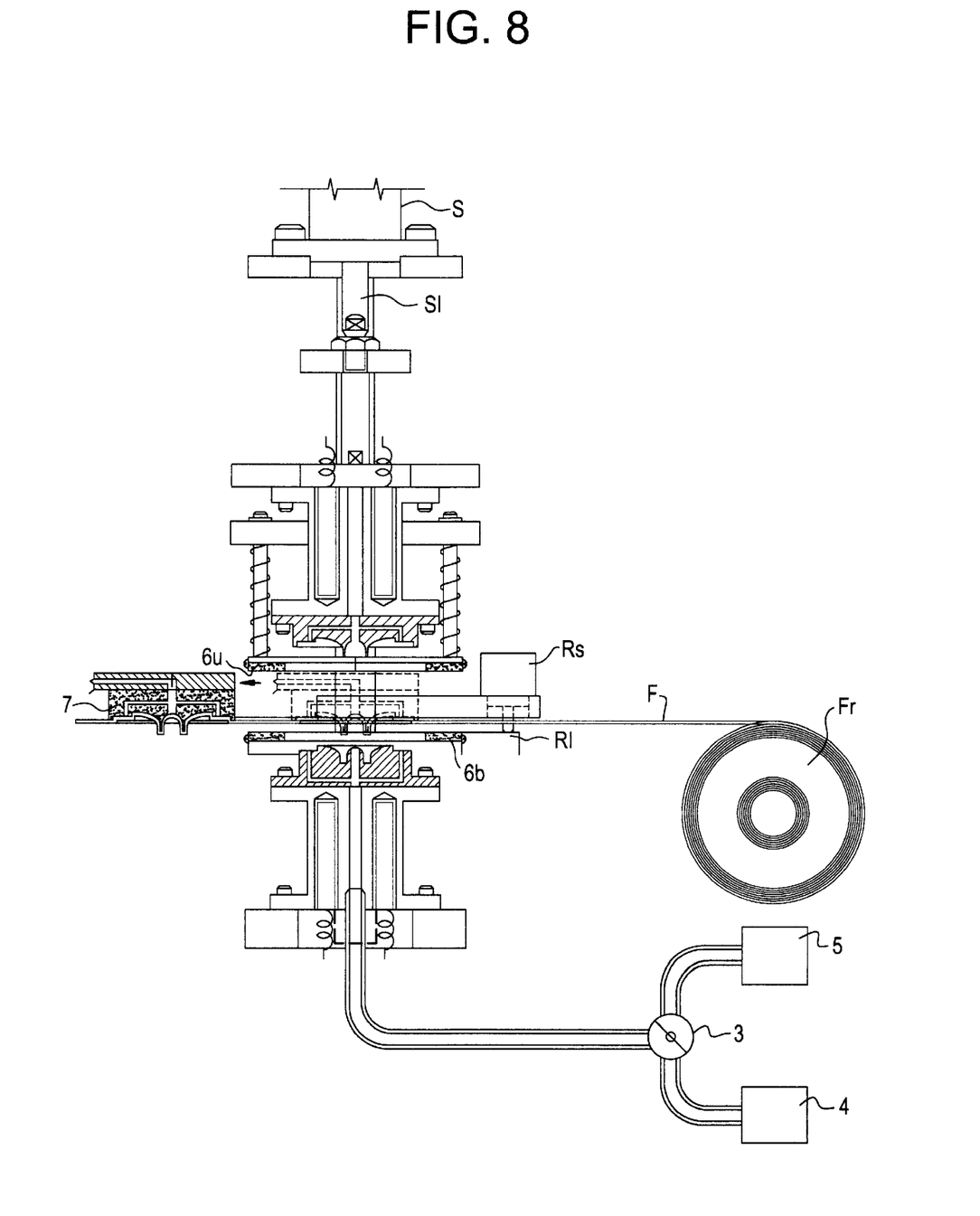
FIG.8 is a diagram showing a state wherein the pickup jig is removed, the product is transported outside of the metal molds, and a new film sheet frame is pulled and placed on the metal mold.

As the arm A of the film transport device is moved in the pickup direction (direction opposite to the film roll Fr in FIG.8), the molded product attracted and attached to the pickup jig 7 is moved to a predetermined position at the outside of the metal molds 1u and 1b as shown in FIG.8 and the film F frame to be next molded is pulled between the metal molds 1u and 1b. At this time, the lock cylinder Rs is released to retract the rod R1, the lower ring 6b is moved to the initial position by the springs Sp, the suction device for the pickup jig 7 is stopped, the next product is molded, and the first molded product is peeled off from the pickup jig by its own weight.

The cone portion C, diaphragm guide portion C1, chamber portion Cb, voice coil bobbin bo, and overlap portion C2 of a molded product of this embodiment were cut and separated. Each separated partial film was measured by a density gradient tube method. The obtained value was 1.384 to 1.400, confirming a predetermined density of the film. The molding time was shortened by 50% relative to the molding method the present applicant has proposed already.

In this embodiment, a PPTA film is molded. If the temperatures of the metal molds 1u and 1b are adjusted, various other materials may be used, including a heat proof resin film such as polyimide resin, thermoplastic film or thermosetting resin conventionally used in common, and various types of woven cloth and unwoven cloth such as cloths made of thermoplastic fibers, mixed woven cloth and mixed unwoven cloth of natural fibers and thermoplastic fibers or thermoplastic fibers and thermosetting fibers.

For example, the case where a polyimide resin film is molded will be described. The rings and other devices are sequentially operated by programs in the manner same as the PPTA film molding. By setting the upper metal mold 1u to 280° C., the lower metal mold 1b to 250° C., the falling speed of the cylinder S to about 1.5 mm/sec, it was possible to form a practically usable molded product with the molding time of about 15 seconds.

According to the molding method for molding a product by using a film sheet, the film pushing rings disposed outside of the upper and lower rings are controlled to move and stop independently from the motion of the upper and lower metal molds, thereby eliminating a defective molded product to be caused by the motion of the rings after the molding.

A finished molded product is attracted and attached to the pickup jig having a surface shape matching the molded product, and removed from the metal molds after the jig is moved outside of the press machine. It is therefore possible to reliably remove a finished molded product even if it is a deep drawing product having a plurality of vertical walls.

The molding film is not limited to a PPTA film, but other films, woven cloths, or unwoven cloths may be used for the molding. If a heat resistant film such as a polyimide resin film is used, the molding time is about 15 seconds so that the production efficiency can be improved by about 2.7 to 4 times the conventional method whose molding time is about 40 to 60 seconds. A conventional molding method using a thermoplastic film or the like removes a molded product by cooling the metal molds after the thermal molding. In this invention, a molded product can be removed from the metal molds without cooling the metal molds with the molding temperatures being maintained. The cooling time is not necessary, considerably shortening the molding time.

According to the molding apparatus of this invention, for the motion control of the rings, the ring on the side of the metal mold attracting and attaching a molded metal is fixed to the lowest fall position of the ring, and after the metal molds are released and the molded product is removed from the metal molds and the jig, the ring is moved to the initial position. This motion control can be easily realized with a low cost by simply mounting rock cylinders at two positions.

The rings are adapted to be detached in the direction other than the direction of clamping the rings. It is therefore possible to use a jig such as a driver, allowing the rings and metal molds to be easily dismounted and improving the maintenance.

If the pickup jig is cooled, a molded product attached to the jig can be cooled, improving the strength of the molded product to the removed. If a thermoplastic film is used, a stable shape of a molded product can be obtained.

The pickup jig is mounted on the film transport device which is moved while a molded product is attached to the jig. While the pickup jig moves, the film can be automatically fed. It is therefore possible to realize the apparatus at a very low cost by slightly working a conventional molding apparatus.

What is claimed is:

1. An apparatus for thermally molding a product from a film sheet comprising:

a pair of metal molds, comprising a first metal mold and a second metal mold at least said second mold being movable between an open position wherein there is a gap between the metal molds and a closed position wherein said film sheet is clamped between the metal molds and thereby molded into said product;

heating means which heat the metal molds;

a pair of film pushing rings comprising a first pushing ring disposed adjacent said first metal mold and a second film pushing ring disposed adjacent said second metal mold, said pair of film pushing rings being spaced from one another before said metal molds are clamped and adapted to mate with each other during said clamping of said metal molds;

ring moving mechanism for moving said first and second rings while said rings are mated with each other so that said first and said second rings together move toward the first metal mold in a mechanical link to the movement of the second metal mold to the closed position, the first film pushing ring being biased toward said second metal mold by an elastic force, means for fixing the first film pushing ring at the side of said first metal mold on which the molded product is left when the clamping exercised by said metal molds is released so that the first pushing ring does not exert a picking-up force to peel off the molded film product from said first metal mold; and a pickup jig having a surface shape matching the surface shape of said molded product for picking up the molded product left on said first metal mold.

2. An apparatus for thermally molding a product from a film sheet according to claims 1, wherein opposite edges of each said film pushing rings are slidably inlaid into horizontal channels provided in mounting bases.

3. An apparatus according to claim 1, further comprising a suction and exhaustion mechanism for sucking or exhausting air from a hole or slit opening in the surface of at least one of said first and second metal molds.

4. An apparatus according to claim 1 further comprising suction and exhaustion means connected to said first the metal mold for sucking the molded film product to be left on said first the metal mold when the clamping exercised by the metal molds is released.

5. An apparatus according to claim 4, wherein said suction and exhaustion means connected to said first the metal mold operates in an exhaustion mode at an instant when said pickup jig picks up the molded film product.

6. An apparatus according to claim 1, wherein said pickup jig is shifted onto the molded film product after the first metal mold and the second ring have been lifted up.

7. An apparatus according to claim 6, wherein said pickup jig is cooled before being shifted onto the molded film product to pickup the molded film product.

8. An apparatus according to claim 1, wherein said pickup jig includes suction means for sucking the molded film product to pickup the molded film product.

9. An apparatus according to claim 8, wherein the suction means of said pickup jig stops its suction operation when the pickup jig is to release the molded film product.

10. An apparatus according to claim 1 wherein said means releases the fixing operation on the first film pushing ring after the pickup jig has taken the molded film product outside said first the metal mold.

11. An apparatus according to claim 10, wherein said first film pushing ring is returned to a position before the clamping by the release of the fixing operation.

* * * * *